(12) United States Patent
Beverly et al.

(10) Patent No.: US 7,306,020 B2
(45) Date of Patent: Dec. 11, 2007

(54) TIRE INFLATION SYSTEM AND WHEEL SENSOR AND METHOD OF USE

(75) Inventors: James A. Beverly, Kalamazoo, MI (US); Gerard O. McCann, Kalamazoo, MI (US); Daryl J. Stacer, Portage, MI (US); William F. Bleeke, Fort Wayne, IN (US); John M. Kaste, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 207 days.

(21) Appl. No.: 11/109,143

(22) Filed: Apr. 19, 2005

(65) Prior Publication Data

US 2006/0231184 A1    Oct. 19, 2006

(51) Int. Cl.
*B60C 23/10* (2006.01)

(52) U.S. Cl. ..................... 152/417; 152/415
(58) Field of Classification Search ............ 301/105.1; 152/415, 416, 417; 324/207.25
See application file for complete search history.

(56) References Cited

U.S. PATENT DOCUMENTS

| 4,027,753 | A | * | 6/1977 | Lantz ..................... 188/181 R |
| 4,689,557 | A | * | 8/1987 | Smith et al. ................. 324/174 |
| 4,844,138 | A | | 7/1989 | Kokubu |
| 5,287,906 | A | | 2/1994 | Stech |
| 5,327,346 | A | | 7/1994 | Goodell |
| 5,487,005 | A | | 1/1996 | Genise |
| 5,769,979 | A | * | 6/1998 | Naedler ..................... 152/417 |
| 6,064,936 | A | | 5/2000 | Nakajima |
| 6,269,691 | B1 | * | 8/2001 | Sowatzke et al. .......... 73/146.2 |
| 6,278,361 | B1 | | 8/2001 | Magiawala et al. |
| 6,313,742 | B1 | | 11/2001 | Larson |
| 6,315,457 | B1 | | 11/2001 | Kapaan et al. |
| 6,384,720 | B1 | | 5/2002 | Juzswik et al. |
| 6,435,238 | B1 | * | 8/2002 | Hennig ..................... 152/417 |
| 6,553,290 | B1 | | 4/2003 | Pillar |
| 6,575,269 | B1 | | 6/2003 | Skoff et al. |
| 6,585,019 | B1 | * | 7/2003 | Ingram ..................... 152/417 |
| 6,668,888 | B1 | | 12/2003 | Beesley et al. |
| 2001/0052258 | A1 | * | 12/2001 | Ehrlich et al. ............. 73/118.1 |
| 2003/0152302 | A1 | | 8/2003 | Chinitz et al. |

FOREIGN PATENT DOCUMENTS

EP        1099574 A1      5/2001

OTHER PUBLICATIONS

Francis E. Kennedy et al., Modern Tribology Handbook, 2001, CRC Press LLC, vol. I & II, Glossary.*
Wabash National, MBS-2 Installation Guide, Website page, Aug. 2002, http://www.wabashnational.com/pdgs/MBS-2.pdf.

* cited by examiner

*Primary Examiner*—Russell D. Stormer
*Assistant Examiner*—Kip Kotter
(74) *Attorney, Agent, or Firm*—Marshall & Melhorn LLC

(57) ABSTRACT

A tire inflation system and wheel speed sensor system having a hollow shaft rotatable with a drive mechanism. The shaft extends into the hollow end of an axle. A angular velocity system rotates with the shaft within the hollow end of the axle. A sensor, mounted within the axle, senses the rotation of the angular velocity system. The hollow shaft is a conduit for air from an air source to at least one tire.

21 Claims, 6 Drawing Sheets

TIRE INFLATION SYSTEM AND WHEEL SENSOR AND METHOD OF USE

FIELD OF THE INVENTION

The present invention relates to a combined tire inflation system and wheel speed sensor and a method of using the same.

BACKGROUND OF THE INVENTION

The wheel end area of a vehicle is an area having many structures and systems important for vehicle operation and performance. For example, structures and systems relating to vehicle braking, vehicle suspension, vehicle steering and vehicle drive, may all be found in the wheel end area. Those skilled in the art will appreciate that some or all of these structures and systems must co-exist in the same general wheel end area. Additional structures and systems, such as wheel performance sensors and tire inflation systems, must fit in this same area also. Various prior art systems are known that teach sensors and/or tire inflation systems, however, such systems have not yet efficiently combined the two to minimize the space they occupy.

For example, U.S. Pat. No. 6,435,238 teaches a tire inflation system located in a vehicle axle. A fitting is secured to an air passage tube extending through the hub cap. The fitting has a stationary rotary seal for sealing the fitting to the tube. A separable component from the fitting engages an air supply tube that extends through the axle. A speed sensor assembly is also taught, however, the rotor of the sensor is located radially outward from the axle. The stator of the assembly is located within the axle.

U.S. Pat. No. 6,585,019 provides for a tire inflation system comprising a shaft extending through a hub cap. One end of the shaft is connected to an air hose. The other end of the shaft is connected to a rotary housing. A pair of bearings is mounted within the housing to allow the housing to rotate on the shaft. A reduced diameter portion of the rotary housing projects through a centrally disposed aperture in the end wall of the hub cap. The rotary housing is sealably secured against the exterior end wall of the hub cap. A wheel speed sensor is not taught.

U.S. Pat. No. 6,575,269 teaches a wheel bearing located between a wheel support and a hub. The hub is driven by a drive shaft housed within the hub. Inflation and deflation of a tire occurs via a connecting member through channels and/or bores in the wheel support. Additional channels and/or bores provide a fluid connection to a control valve mounted on the hub.

The prior art generally discussed above has several disadvantages. First, some prior art documents teach a sensor or a tire inflation system, but not both. Second, the prior art systems do not combine a wheel sensor with a tire inflation system so as to minimize the space used by these structures at the wheel end. Third, some prior art designs locate the sensing elements outside of the axle. These designs lead to increase costs since non-standard hub caps and additional hardware to center the sensing elements in the hub caps must be used. In light of the disadvantages of the prior art, it would advantageous to compactly combine a wheel speed sensor with a tire inflation system substantially within the vehicle axle.

SUMMARY OF THE INVENTION

The present invention is directed toward a combined wheel sensor and tire inflation system and method of using the same. The system comprises a non-rotating axle having at least one open end. A drive mechanism, such as a hub cap, is located adjacent the open end of the axle. A shaft, having a first portion and a second portion, is provided. The first portion is connected to the drive mechanism for rotation therewith and the second portion is rotatably mounted on at least one bearing within the axle. An angular velocity system is mounted on the shaft for rotation therewith. A non-rotating sensor is mounted within the axle adjacent the angular velocity system.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
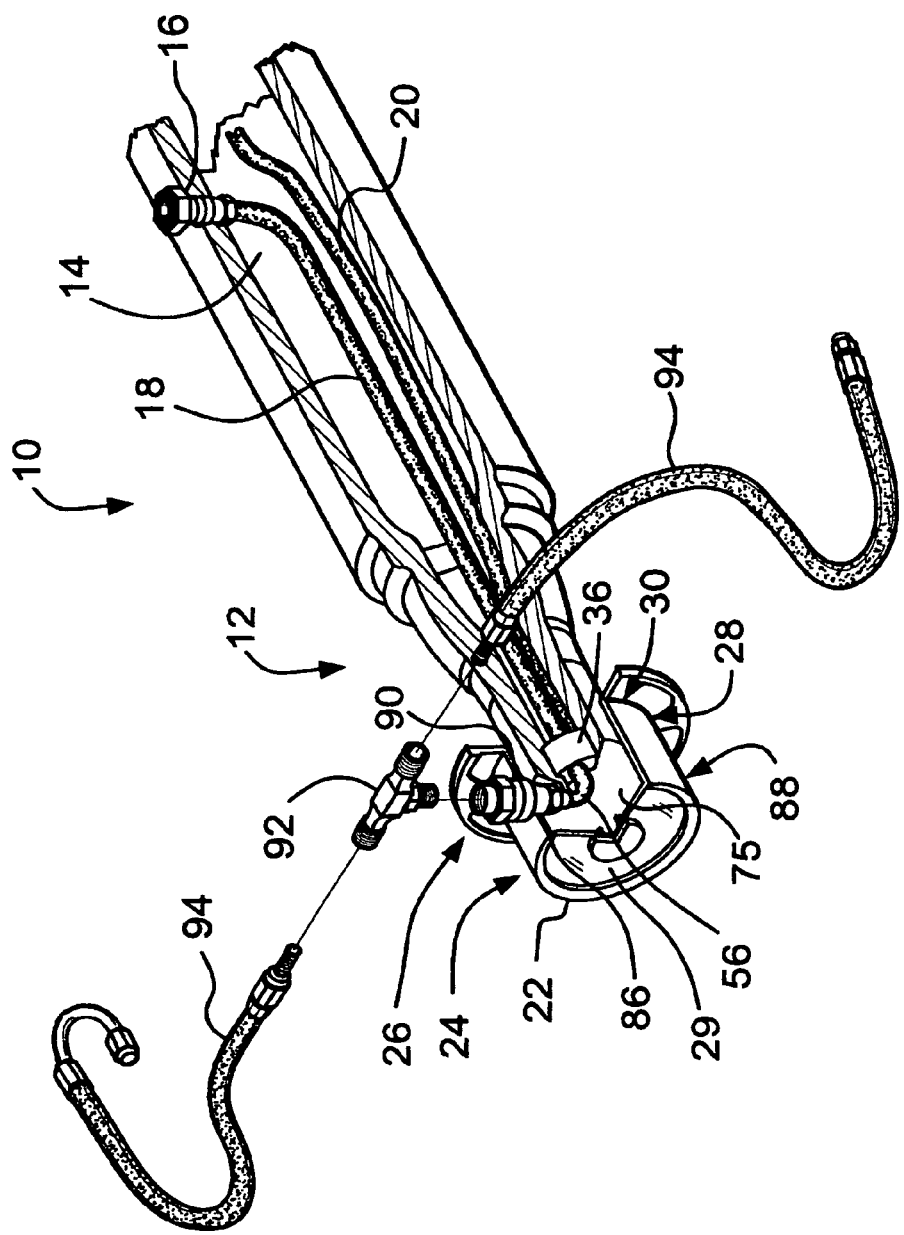
FIG. 1 is a perspective, partial cut away view of the present invention.

Referring now to FIG. 1, a non-rotating axle 10 of a vehicle is partially depicted. FIG. 1 depicts a first end 12 of the axle 10. Those skilled in the art will readily appreciate that the axle 10 has a second end (not shown) that is substantially identical to the first end 12. The present description and figures accompanying the description will refer to the first end 12 of the axle 10. It should be understood, however, that identical, or at least substantially similar structures and methods relating to the first end 12, can also be used with the second end of the axle 10.

The present invention has equal applicability for any vehicle, however, in the preferred embodiment, the axle 10 depicted and described herein is ideally suited for a commercial highway vehicle, such as a suitable axle 10 on either a tractor or a trailer of a tractor-trailer combination. By way of example only, the axle 10 may be a non-driven, non-steerable trailer axle from Dana Corporation of Toledo, Ohio having part number Dana D22AX 503 1095. Other axles for trailers, as well as other vehicles, are also well within the scope of the present invention.

Preferably, the axle 10 has a substantially hollow interior portion 14, as shown in FIG. 1. It is also within the scope of the present invention to utilize an axle 10 having just a hollow channel extending through the axle 10, or an axle 10 having a hollow first end 12.

As shown in the preferred embodiment of FIG. 1, the axle 10 has an aperture 16 for receiving an air line 18. The air line 18 is connected, via one or more tubes or lines (not shown), to a compressor and/or an air reservoir (neither of which are shown), carried on the vehicle. In the present disclosure, the air line 18 itself will be referred to as an air source or source of air.

Preferably, the air line 18 extends from the aperture 16 through the axle 10 toward the first end 12 of the axle 10. Those skilled in the art will appreciate that a second air line (not shown) may extend through a second aperture, or the same aperture 16, for connection to the compressor or air reservoir. Alternatively, the second air line may be connected to the first air line 18 with a common connector, such as a T-fitting. The second air line extends to the second end of the axle 10 and would be used in a manner substantially similar to the first air line described in detail below.

The interior portion 14 of the axle 10 preferably also contains at least one electrical cable 20. The cable 20 extends at least to the first end 12 of the axle 10 and may extend to the second end of the axle 10. The cable 20 exits the axle 10 through an aperture (not shown) where it is preferably electrically connected to an electronic control unit (not shown) of the vehicle.

A drive mechanism, such as a hub cap 22, is located adjacent the first end 12 of the axle 10. The hub cap 22 may be of any design known to those skilled in the art. By way of example only, the hub cap 22 may be such as part number Dana 676401 available from Dana Corporation of Toledo, Ohio. Preferably, the hub cap 22 has a hat-shaped portion 24 and circular flange 26 radially extending from a base 28 of the hat-shaped portion 24. The hat-shaped portion 24 comprises a face plate 29.

Figure 2:
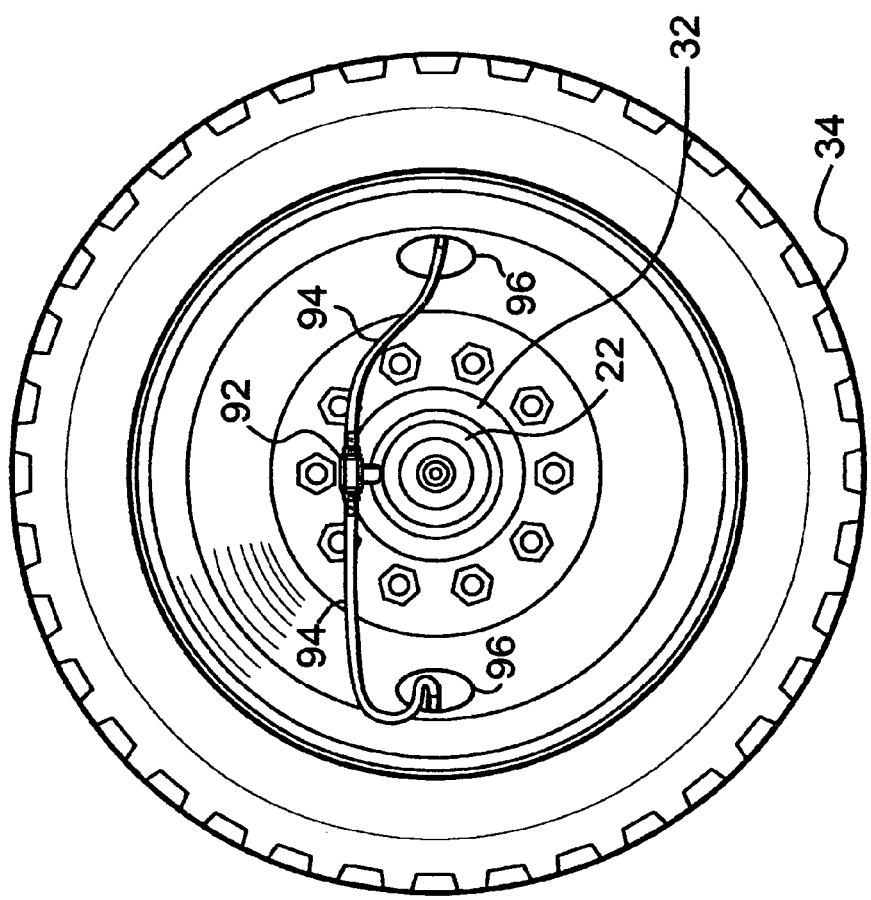
FIG. 2 is a side view of the present invention installed in a wheel.

At least a portion 30 of the hub cap 22 may radially overlap the first end 12 of the axle 10. It is well within the scope of the present invention, however, to locate the hub cap 22 in a non-overlapping relationship with the axle 10. The present invention is not, limited to either embodiment. The hub cap 22 is secured within a wheel 32, as shown in FIG. 2. The wheel 32 is used to mount one or more tires 34 thereon. Those skilled in the art know that the tire 34, as it travels over the ground, rotates the wheel 32 and thus the hub cap 22. Friction reducing devices, such as bearings (not shown), are located between the wheel 32 and the axle 10 to enable rotation of the wheel 32 with respect to the axle 10.

Figure 3:
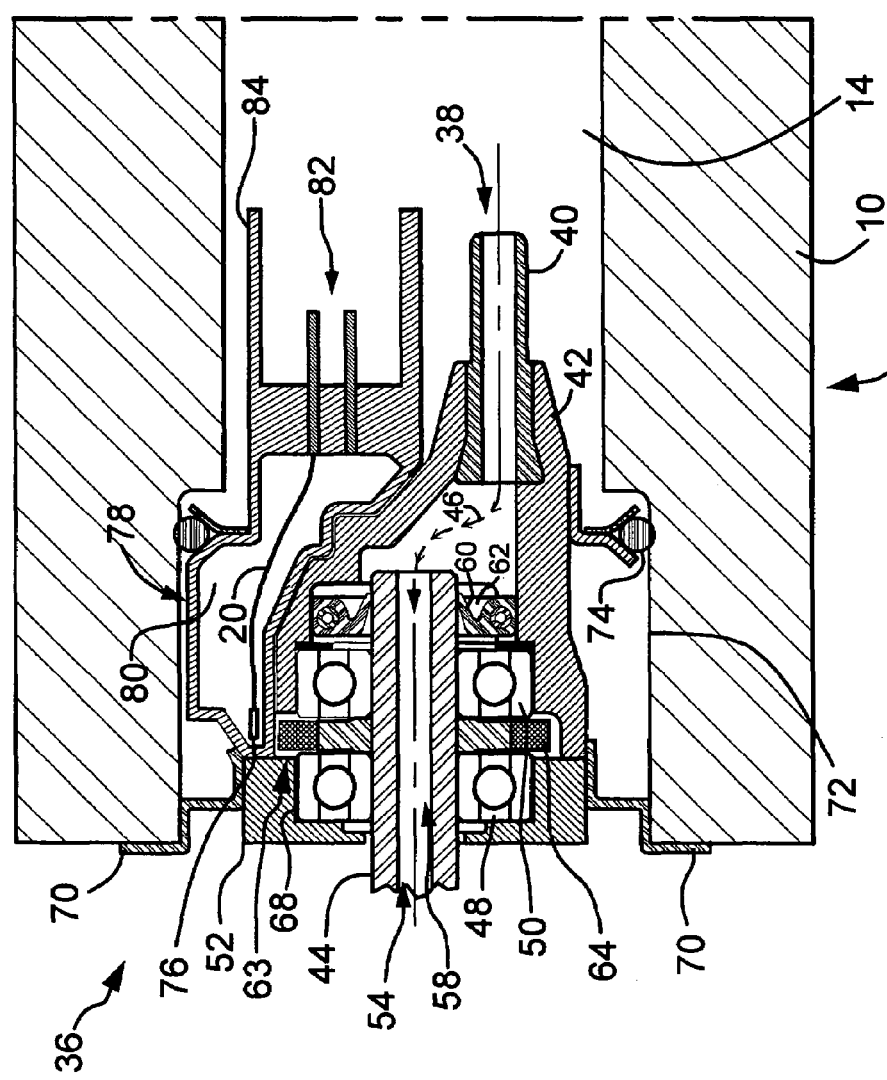
FIG. 3 is a cut away side view of the present invention in an axle.

Referring now to FIG. 3, a structure 36 of the present invention, located substantially within the axle 10, can be seen. An air line connector 38 provides a connection from the air line 18 to the structure 36. The air line connector 38 depicted in FIG. 3 has a substantially smooth outside diameter 40, however, it is well within the scope of the present invention to provide an air tube fitting (not shown) thereon. The air line fitting may be comprised of one or more barbs, set of threads, and/or a series of alternating ridges and grooves to secure the air line 18 to the air line connector 38. A push-to-connect fitting as known to those skilled in the art may also be used to secure the air line 18 to the air line connector 38.

Preferably, the air line connector 38 is secured in place by, and received by, a backing plate 42. The backing plate 42 locates the air line connector 38 in fluid communication with a shaft 44 mounted within the structure 36. The backing plate 42 may align the air line connector 38 with the shaft 44 or, as seen in FIG. 3, the backing plate 42 may slightly offset the shaft 44 and the air line connector 38. In the latter embodiment, the backing plate 42 provides a sufficiently clear fluid path 46 between the air line connector 38 and the shaft 44. The backing plate 42 may be one piece or multiple pieces. The air line connector 38 may be integrally formed with the backing plate 42 or separately formed therefrom and then attached to the backing plate 42.

The shaft 44 is mounted for rotation within the axle 10 on at least one friction reducing device. The friction-reducing device may be one or more bearings. Those skilled in the art will appreciate that the bearings may be such as bushings, ball bearings, needle bearings or tapered bearings. In the preferred embodiment depicted in FIG. 3, a first bearing 48 is seated within a front housing 52 and a second bearing 50 is seated in the backing plate 42. Those skilled in the art will appreciate that the bearings 48, 50 can be seated on any structure, or structures, within the axle 10 and the present invention is not limited to locating the bearings 48, 50 within the backing plate 42 and in the front housing 52 as depicted and described in the preferred embodiment.

The shaft 44 has a first portion 54, which is mounted for rotation as described above, in the axle 10. The shaft 44 also has a second portion 56, as shown in FIG. 1, which is described in more detail below.

Preferably, the shaft 44 is a tube having a substantially hollow internal channel 58. The reference number for the shaft and tube will be interchangeably used hereinafter as 44. The internal channel 58 is in fluid communication with the air line connector 38 via the fluid path 46 described above.

The tube 44 can be a single piece or multiple pieces joined together. Additionally, the tube 44 can be rigid, semi-rigid or flexible.

At least one seal 60 is located about the first portion 54 of the tube 44. Preferably, the seal 60 is a rotary seal that contacts the tube 44 but permits free rotation of the tube 44. The seal 60 also prevents air from escaping between the seal 60 and the tube 44.

It must be appreciated that the structure 36 may be continuously pressurized or intermittently pressurized. It has been discovered that intermittently pressurizing the structure 36 leads to longer seal 60 life. The invention, however, works equally well under continuous pressure.

The seal 60 is located adjacent the second bearing 50, however, those skilled in the art will appreciate that it can be located anywhere along the tube 44. As shown in FIG. 3, the seal 60 is located in a seal compartment 62 within the backing plate 42. Those skilled in the art will appreciate the present invention also includes non-stationary seals, or seals that rotate with the tube 44.

An angular velocity system 63 is secured to the tube 44 for rotation therewith. The angular velocity system 63 may be magnetic or optical. If the system 63 is optical it may be comprised of a toothed ring mounted on the tube 44. A light source shines through the teeth to a sensor. The light source may use visible light or non-visible light. The rotational velocity of the tube 44 can be determined by the pulses of light captured by the sensor from the teeth passing in front of the light.

In the preferred embodiment depicted in the figures, the system 63 is magnetic and comprises a magnet 64 secured to the tube 44 for rotation therewith. The magnet 64 may be such as a multi-pole magnet known by those skilled in the art. As shown in FIG. 3, the magnet 64 is preferably located on the tube 44 between the first bearing 48 and the second bearing 50. It should be appreciated, however, that the present invention is not limited to locating the magnet 64 between the bearings 48, 50. Instead, the magnet 64 may be located anywhere along the tube 44 within the axle 10 as the bearings 48, 50 cause the entire tube 44 to rotate in a very precise position. However, locating the angular velocity system 63, whether it is optical or magnetic, between the two bearings 48, 50, is preferred.

The front housing 52 is provided about the tube 44 to substantially enclose the end 12 of the axle 10. The front housing 52 provides a seat 68 for the first bearing 48, as mentioned above, and also reduces, or prevents, debris and contaminants from entering the axle 10.

A member is used to position the structure 36 within the axle 10. The member may be constructed of any material. For example, the member may be constructed of plastic formed by molding. In a preferred embodiment, the member is constructed of metal and it is formed by stamping.

As depicted in FIG. 3, a stamping 70 assists in positioning the structure 36 within the axle 10. The stamping 70 may be integrally formed with the front housing 52, molded with the front housing 52 or simply secured thereto. Preferably, the front housing 52 and the stamping 70 are simultaneously located in the open end 12 of the axle 10. The stamping 70 may have teeth, ridges, threads, adhesive or other locking means (not shown) that engage with an inside surface 72 of the axle 10 and secure the structure 36 in place. Preferably, the stamping 70 is located within the axle 10 with an interference or friction fit.

A locating device 74, such as an O-ring, or a gasket, is preferably located between the inside surface 72 of the axle 10 and the structure 36, as shown in FIG. 3. The locating device 74 prevents, or reduces, contaminates from entering the axle 10 between the inside surface 72 and the structure 36. Additionally, the locating device 74 may prevent contaminants from the axle 10 itself from leaving the axle 10 where they can damage other parts or systems. The locating device 74 may or may not provide a seal.

The locating device 74 also provides stability to the structure 36 and assists in holding the structure 36 in place in the axle 10. The present invention may also comprise more than one locating devices 74. Locating devices other than O-rings may also be used without departing from the scope of the present invention.

Although it is not depicted in the figures, it should be appreciated that the structure 36 can have one or more vents that vent the cavity 75 enclosed by the hub cap 22 and the interior of the axle 10. It is also within the scope of the present invention to have no vents connecting the cavity 75 enclosed by the hub cap 22 with the interior of the axle 10.

In the preferred embodiment, a sensor 76 is supported adjacent the magnet 64. In a more preferred embodiment, the sensor 76 is a wheel speed sensor designed to determine the rotations of the tube 44 as follows.

Preferably, the sensor 76 can detect forward and reverse rotation of the tube 44. This detection is called quadrature, as known to those skilled in the art, and it may be used for magnetic systems as well as optical systems.

The sensor 76 may have two sensing elements in it or the sensor 76 may be comprised of two physically separate sensing elements. Regardless of the physical embodiment of the sensor 76, the sensing elements are offset from one another.

The offset nature of the sensing elements results in the first sensing element detecting a transition from one magnetic pole, such as south, to the opposite magnetic pole, such as north, when the sensing elements are rotating in one direction, such as forward. Then, before another transition is detected on the first sensing element, the second sensing element detects a transition from one magnetic pole, such as south, to the opposite magnetic pole, such as north.

When the sensing elements rotate in the opposite direction, such as when the vehicle is in reverse, the first sensing element detects a transition from one magnetic pole, such as south, to the opposite magnetic pole, such as north. Then, before another transition is detected on the first sensing element, the second sensing element detects a transition from one magnetic pole, such as north, to the opposite magnetic pole, such as south.

Those skilled in the art will appreciate that depending on the physical property sensed by the sensing elements, the transitions detected may not be strictly from one pole to the pole of opposite polarity. For example, the sensing elements may detect areas of high magnetic field and low magnetic field. Additionally, the sensing elements may detect gradients of magnetic field.

A sensor 76 capable of determining a single direction of rotation may be used in the present invention. In this case, only a single sensing element is needed and quadrature is not used.

Adjacent the backing plate 42, or integrally formed therewith, is an electronics module 78. The electronics module 78 depicted in FIG. 3 preferably has at least one cavity 80 adjacent the rotating magnet 64. The cavity 80 houses the sensor 76. The cavity 80 may also house other sensors such as, but not limited to, one or more accelerometers and/or temperature sensors.

The sensor 76 is electrically connected to a connector pin 82 located on the electronics module 78. This electrical connection is schematically depicted in FIG. 3. It is within the scope of the present invention to connect the sensor 76 directly to the connector pin 82 or to have the sensor 76 connected to various electronics which are then connected to the connector pin 82.

The connector pin 82 may have a two-prong connection or three-prong connection. A two-prong design includes a prong for a signal return, such as a ground, and another prong for both power and a signal. A two-prong design is depicted in FIG. 3. It is also within the scope of the present invention to use the three-prong design wherein one prong is for power, another prong is for a signal return, such as a ground, and the third prong is for a signal.

The connector pin 82 is preferably located within a connector surround 84. A plug (not shown), having a complementary shape to the connector pin 82 and the connector surround 84, is located within the connector surround 84. The plug is electrically connected to the cable 20, discussed above.

As best seen in FIG. 1, the tube 44 extends beyond the end of the axle 10 and into the hub cap 22. In one embodiment depicted in FIGS. 1 and 2, the tube 44 bends so that is it substantially orthogonal with the axle 10. The tube 44 extends through an aperture 86 in the side portion 88 of the hub cap 22 and terminates in a fitting 90. The fitting 90 is connected to T-fitting 92. Two hoses 94 are connected to the T-fitting 92. As best seen in FIG. 2, the hoses 94 extend through apertures 96 in the wheel 32. The hoses 94 eventually connect with tire valves (not shown) of the tires 34 mounted on the wheel 32. Therefore, according to the above-described preferred embodiment of the present invention, a substantially continuous air path is provided from within the axle 10, through the structure 36, through the hub cap 22 to the tires 34.

Figure 4:
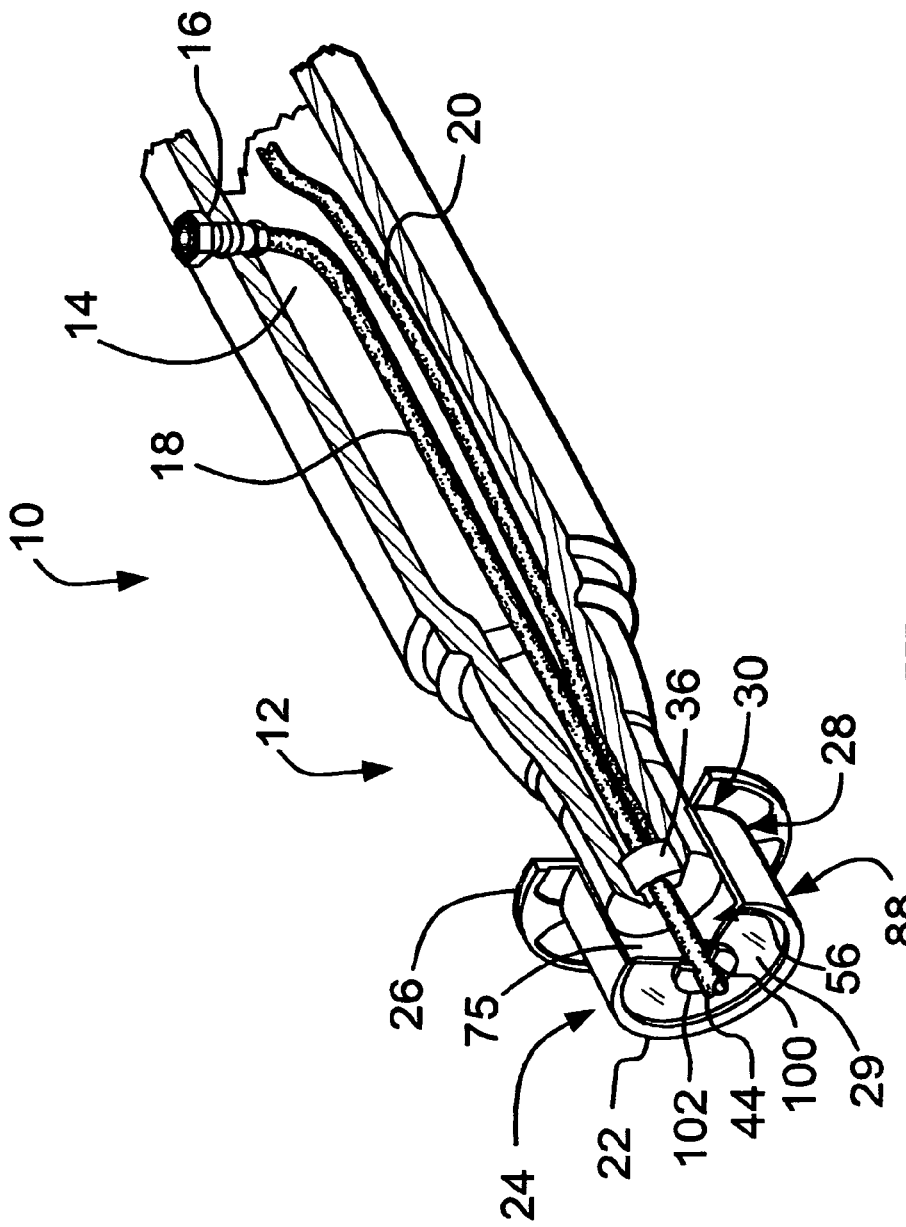
FIG. 4 is a perspective, partial cut away view of an alternative embodiment of the present invention.

An alternative embodiment of the present invention is depicted in FIG. 4 where the tube 44 extends axially through an aperture 100 in a center portion 102 of a drive mechanism, such as the hub cap 22. The tube 44 is provided with one or more fittings and connected to hoses (not shown), as described above, for connection through the wheel 32 to one or more tires 34.

Figure 5:
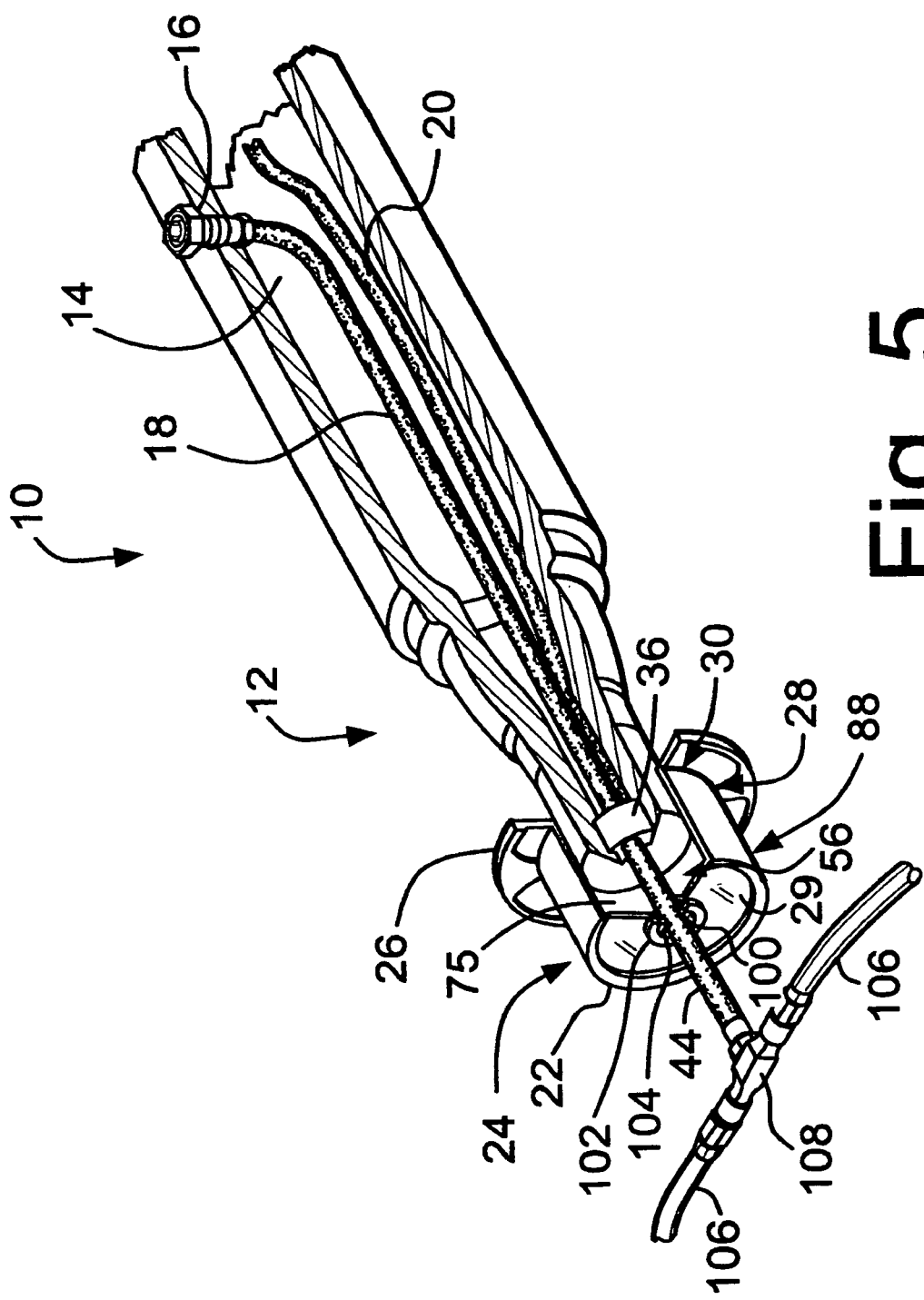
FIG. 5 is a perspective, partial cut away view of yet another alternative embodiment of the present invention.

In yet another embodiment of the present invention depicted in FIG. 5, the tube 44 extends through a center portion 102 of the hub cap 22. The tube 44 is supported in the center portion 102 by a fitting 104, such as a bushing, that permits the hub cap 22 to rotate without providing rotation to the tube 44. The tube 44 is connected to one or more tire hoses 106, such as with a T-fitting 108. Those skilled in the art will appreciate that the tire hoses 106 are connected to one or more tires 34 and rotate therewith thus providing a rotational drive to the tube 44 and thus providing an alternative drive mechanism for the present invention.

Figure 6:
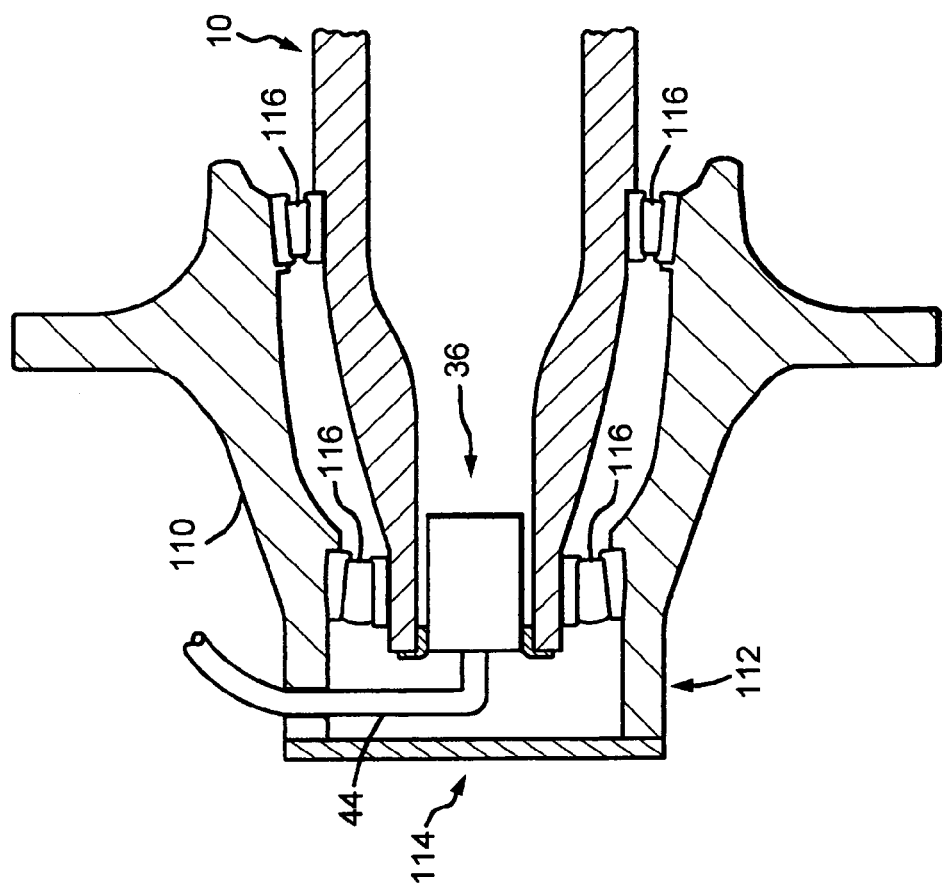
FIG. 6 is a schematic, cut away side view of yet another alternative embodiment of the present invention.

An additional embodiment of the present invention is depicted in FIG. 6, where the axle 10 and the structure 36 located within the axle 10 are shown. A hub 110, having an extended portion 112, extends outwardly from the end of the axle 10. A plate 114 substantially closes the open, extended portion 112 of the hub 110. The hub 110 is supported for rotation on one or more bearings 116.

The tube 44 extends from the structure 36 beyond the end of the axle 10. The tube 44 is angled through the extended portion 112 of the hub 110. As known by those skilled in the art, the hub 110 is rotated by one or more tires 34. As the hub 110 rotates, it carries with it the tube 44, thus providing a rotational drive to the tube 44 and thus providing an alternative drive mechanism for the present invention.

A method of using the present invention comprises connecting the air line 18 to the air line connector 38 and connecting the electrical connector (not shown) to the connector pin 82 within the connector surround 84. The structure 36 is then secured within the stamping 70 by overmolding, frictional engagement, mechanical fasteners, heat staking, connecting complementary interlocking elements, and/or adhesive. Of course, if the structure 36 is integrally formed with the stamping 70, this step can be avoided. The structure 36 and the stamping 70 are then inserted into the open end 12 of the axle 10. The locking means of the stamping 70 and the axle 10 are engaged with one another to securely locate the structure 36 in the axle 10.

The tube 44 is connected to the drive mechanism, such as the hub cap 22, for rotation therewith. By way of example, in the embodiment where the tube 44 extends orthogonally from the axle 10 through the hub cap 22, the tube 44 is secured to the hub cap 22 by locating the tube 44 through the aperture 86 and connecting it to the fitting 90, as seen in FIG. 1.

In the embodiment where the tube 44 extends axially through the hub cap 22, the tube 44 is secured to the hub cap 22 by locating the tube 44 through the aperture 100 and connecting the tube 44 with the fitting (not shown), as depicted in FIG. 4. Those skilled in the art will appreciate that the aperture 100 can be located anywhere in the face plate 29, including off-center.

In the above-described embodiments, connection of the tube 44 with a drive mechanism will result in the tube 44 rotating as the drive mechanism, such as the hub cap 22, the tire hoses 106, or the hub 110, rotates.

For example, those skilled in the art will appreciate that rotation of a tire 34 associated with the wheel 32 connected to the hub cap 22 causes the hub cap 22 to rotate. Rotation of the hub cap 22 rotates the tube 44 connected thereto. As provided above, the tube 44 is rotatably mounted within the axle 10 by the bearings 48, 50. The bearings 48, 50 facilitate accurate rotation of the tube 44 within the axle 10 and allow the tube 44 to rotate in a precise location within the axle 10. The accurate rotation of the tube 44 and the precise location of the tube 44 allows the magnet 64 on the tube 44 to accurately rotate in a specific location.

The accurate rotation of the magnet 64 in a specific location allows the speed sensor 76 to accurately sense the rotation of the magnet 64. The accurately sensed rotation of the magnet 64 is highly reliable information that can be sent to the vehicle electronic control unit (not shown) for processing. The electronic control unit may use the sensed information to calculate wheel speed for an anti-lock braking system, suspension performance, wheel spin, and/or vehicle controllability data.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A tire inflation system seal and speed sensor system, comprising:
   a non-rotating axle having at least one open end;
   a drive mechanism adjacent said open end of said axle;
   a hollow shaft having a first portion and a second portion, wherein said first portion is connected to said drive mechanism for rotation therewith and said second portion is rotatably mounted on at least one bearing within said axle, said second portion also being in fluid communication with an air supply source;
   an angular velocity system mounted on said shaft for rotation therewith;
   a non-rotating sensor mounted within said axle adjacent said angular velocity system; and
   a seal located about said shaft, said seal located inboard of said at least one bearing and said angular velocity system.

2. The system of claim 1, wherein said angular velocity system is a multi-pole magnet mounted on said shaft within said axle.

3. The system of claim 1, wherein said drive mechanism is a hub cap and said first portion of said shaft extends through a face plate of said hub cap.

4. The system of claim 1, wherein said drive mechanism is a hub cap and said first portion of said shaft extends through a side portion of said hub cap.

5. The system of claim 1, wherein said shaft is rotatingly supported within said axle by at least two bearings and said angular velocity system is mounted for rotation with said axle between said two bearings.

6. The system of claim 1, wherein said sensor is mounted within a backing plate so as to be adjacent said rotating angular velocity system.

7. The system of claim 6, wherein said sensor is electrically connected to a connector pin located in said backing plate.

8. The system of claim 6, wherein said rotary seal is located in a rotary seal compartment defined by said backing plate.

9. The system of claim 1, wherein said drive mechanism is at least one tire hose.

10. The system of claim 1, wherein said drive mechanism is a wheel hub.

11. A tire inflation system seal and speed sensor system, comprising:
   a non-rotating axle having at least one open end;
   a drive mechanism adjacent said open end of said axle;
   a tube having a first portion and a second portion, wherein said first portion is connected to said drive mechanism for rotation therewith and said second portion is rotatably mounted on two bearings within said axle, wherein said second portion is connected to a source of air;
   a magnet mounted between said two bearings on said tube for rotation therewith within said axle;
   a non-rotating wheel speed sensor mounted within said axle adjacent said magnet; and
   at least one rotary seal mounted inboard from said bearings and said magnet.

12. A method for combining a tire inflation system with a wheel sensor, comprising:
   providing a rotatable drive mechanism adjacent a non-rotating axle of a vehicle;
   connecting a first portion of a tube to said rotatable drive mechanism and connecting a second portion of said tube to a source of air within said axle;
   providing two bearings within said axle to rotatingly support said tube within said axle;
   locating an angular velocity system on said tube for rotation therewith;
   locating a seal about said tube, said seal being located inboard of said bearings and said angular velocity system; and
   locating a non-rotating wheel speed sensor within said axle to sense the rotation of said angular velocity system on said tube.

13. The method of claim 12, wherein said seal is sealingly engaged with said tube yet said seal permits rotation of said tube.

14. The method of claim 12, wherein said drive mechanism is a hub cap and said first portion of said tube is connected to a center portion of said hub cap for rotation therewith.

15. The method of claim 12, wherein said drive mechanism is a hub cap and said first portion of said tube is connected to a side portion of said hub cap for rotation therewith.

16. The method of claim 12, wherein air is provided from said source of air through said tube to at least one tire.

17. The method of claim 16, wherein said source of air continually pressurizes said tube or intermittently pressurizes said tube.

18. The method of claim 12, wherein said bearings are used to position said tube so that said angular velocity system on said tube is in precise alignment with said sensor.

19. The method of claim 12, wherein said angular velocity system is a multi-pole magnet.

20. The method of claim 12, wherein said drive mechanism is a rotatable tire hose.

21. The method of claim 12, wherein said drive mechanism is a wheel hub.

* * * * *